UNITED STATES PATENT OFFICE.

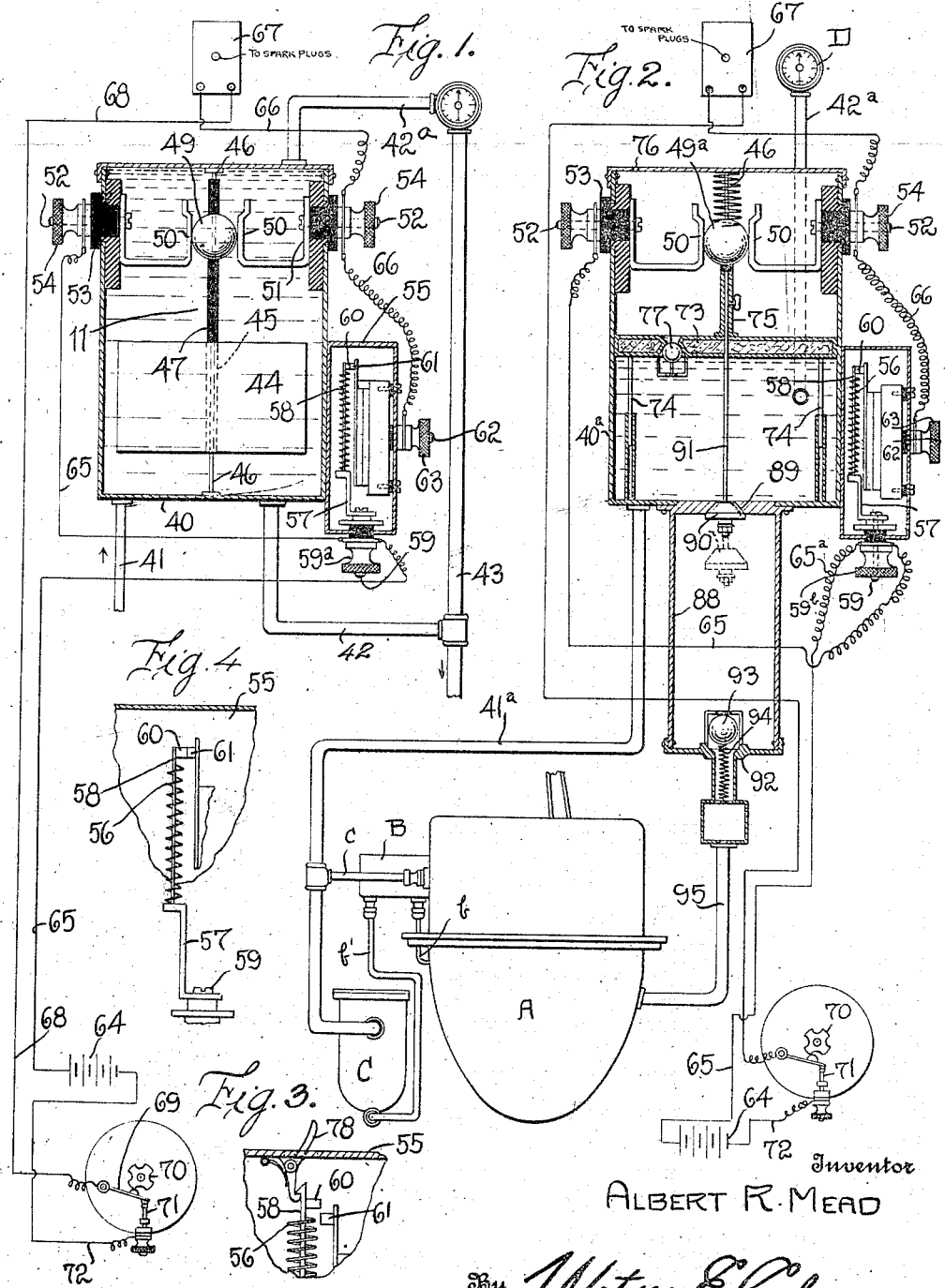

ALBERT R. MEAD, OF ARDMORE, OKLAHOMA.

PRESSURE OR FLOAT OPERATED CIRCUIT-CONTROLLER.

1,277,625.  Specification of Letters Patent.  Patented Sept. 3, 1918.

Application filed January 6, 1917. Serial No. 141,005.

*To all whom it may concern:*

Be it known that I, ALBERT R. MEAD, a citizen of the United States, residing at Ardmore, in the county of Carter and State of Oklahoma, have invented certain new and useful Improvements in Pressure or Float Operated Circuit-Controllers, of which the following is a specification, reference being had to the accompanying drawings.

This invention relates to devices for closing or opening a circuit when the level or pressure of liquid in a container or pipe system falls below a predetermined point or degree and particularly to devices of this character wherein the closing or opening of the circuit will automatically affect the operation of a certain piece of machinery.

One object of the invention is to provide a mechanism of this character which is particularly applicable to the lubrication systems of automobiles so that it will act as a safeguard against a dangerous decrease in the amount of oil in the oil reservoir or a decrease in pressure in the oil circulating system, the device being equally applicable, however, in connection with the gasolene tanks, the device operating automatically in case the gasolene is getting low.

A further object of the invention is to provide in connection with a device of the character described means so connected to the ignition system of the motor that the ignition system will be energized for a predetermined time after the fall of oil below a predetermined point so as to give the pump a reasonable time to again supply the proper amount of oil to the lubrication system.

Other objects will appear in the course of the following description.

I have illustrated in the accompanying drawings my system as applied to protecting an automobile or other internal combustion engine from the consequences of an undue decrease in lubricating oil but I wish it understood that I am not limited to this application of my mechanism but that this embodiment of my invention is to a large extent purely illustrative.

In the accompanying drawings, Figure 1 is a vertical sectional view through one form of circuit controller, showing diagrammatically the electrical connections;

Fig. 2 is a vertical sectional view through a modified form of the controller shown in Fig. 1, both Figs. 1 and 2 showing the electrical circuits diagrammatically;

Fig. 3 is a fragmentary detail view showing a latch mechanism for the thermostat of Figs. 1 and 2;

Fig. 4 is an enlarged elevation of the thermostat illustrated in Figs. 1 and 2.

In Fig. 1 I show a mechanism particularly adapted to lubricating systems wherein the lubricating oil is circulated or operates under pressure. In this figure, 40 designates an oil-tight container which is installed or inserted in the supply line of this system. I have illustrated this container as being connected at one end to a pump (not shown) by the pipe 41 and as having a return pipe 42 and a pipe 42ª leading from the upper end of the container to a sight feed or pressure gage and thence to the crank case by a pipe 43 to which 42 is connected. I want it understood, however, that this arrangement is purely illustrative. Disposed within the container is a float 44. This float I have illustrated as being formed with a central passage 45 formed by a tube which extends upward above the float. A guide 46 is arranged in the tank and extends vertically upward therethrough and is attached at its upper and lower ends to the upper and lower ends of the container and this guide passes through the tubular member 45. The tubular member 45 carries at its upper end the globular contact 49 which is made of conductive material, this contact being insulated from the tubular member 45 and from the guide as by an insulating sleeve 47 on the member 45. Disposed on opposite sides of the path of movement of the conducting member 49 are the resilient contacts 50. Both of these contacts are alike and each contact at its inner end is bent upward as at 51 and connected to a binding screw 52 which passes through the wall of the container and is insulated therefrom as by a fiber bushing 53. Each binding screw carries upon it the binding nut 54. Normally the contact is disposed between the contacts 50 and in electrical engagement with these contacts but if the float 44 falls below a predetermined point, the contact 49 will be withdrawn from electrical engagement with the contacts 50.

Disposed in connection with the container 40 and illustrated as mounted upon the side of this container is a casing 55 inclosing a thermostatic circuit breaker. This is illustrated as formed by a resistance coil 56 whose lower end is mounted upon a bracket 57. The resistance coil surrounds and is electrically connected to a metallic strip 58, whose index of expansion under heat is relatively high. The bracket 57 is metallic and is in electrical engagement with the binding screw 59. This bracket 57 and the binding screw is insulated from the wall of the container by fiber bushings and the binding screw carries the binding nut 59ª. The upper end of the strip 58 carries upon it a contact 60 and operating in conjunction with this contact 60 is a contact 61 which is mounted in any suitable manner within the casing 55 but insulated therefrom and is in electrical engagement with a binding screw 62 passing through the wall of the casing but insulated therefrom and on this binding screw is the binding nut 63.

From the battery 64 leads a conductor 65 which is electrically engaged with the binding screws 58 by means of the binding nut 59ª and I have illustrated this conductor as being continued on beyond the binding screw 58 and connected with the binding screw 52 of one of the contacts 50. The binding screw 52 of the opposite contact 50 is electrically connected by a conductor 66 with the binding screw 63 and thus with the contact 61. This conductor 66 is continued on beyond the binding screw 52 and passes into the coil box 67 of the usual spark coil. The construction of this spark coil is not illustrated as it is well understood. From the other terminal of the spark coil a conductor 68 extends to the circuit breaker arm 69 of the usual commutator or breaker, whose cam is designated 70. This arm 69 makes and breaks contact with the contact 71 which is connected by a binding screw to a conductor 72 in turn connected to the negative pole of the battery.

The operation of this form of my invention will be obvious. Normally the current passes from the battery to the binding screw 59 and from thence to the binding screw 52, from thence across the contacts 50 and 49 and the other binding screw 52 to the conductor 66 and thence to the coil box, through the coil, through the commutator and back to the battery again. When both circuits are closed, current will pass through the resistance coil 58 and through the contacts 50, the relative values of the two currents, however, being inversely proportionately to the resistance of the two circuits and a relatively slight amount of current will, therefore, pass through the resistance coil. Now, if the pressure within the container 40 be reduced or the float 44 falls for any reason due to a decrease in pressure or amount of oil in the container, the contact 49 will be withdrawn from between the contacts 50. Under these circumstances the circuit through the spark coil would be broken but it is desirable to avoid this immediate break of the spark coil circuit so as to give a chance for the pump to operate and to again fill up the container. Hence when the circuit is broken by a descent of the float and of the contact member 49, which constitutes a switch or circuit breaker, all of the current will then pass from the battery through the wire 65 to and through the binding screw 59 to the coil 56, the contacts 60 and 61, the binding screw 52 and the conductor 66 to the spark coil, the commutator and so back to the battery. As the current passes through this resistance coil 56 it will gradually heat the coil and the strip 58 will expand and this expansion of the strip will carry the contact 60 upward out of contact with the contact 61 and the circuit will be automatically broken for a predetermined time. When the circuit is broken, the circuit through the spark coil is broken and the engine will of course stop.

I wish it understood that while I have illustrated the switch or circuit breaking member 49 as being vertically movable by the float 44 and as being disposed within the container 40, yet it is obvious that it may be disposed in other situations and operatively connected to the float. I do not wish to limit myself to a vertically movable member 49. Furthermore any type of contact may be used or made by the member 49 such as a make and break, wiping contact, sliding or magnetic contact. It is also possible to leave off the thermostat but this is preferable as it gives the lubricant pump time to get into action if there is any defect in the pump which would cause a delayed action of it. It will be also obvious that a warning light may be inserted in the circuit if desired. Here again I do not wish to be limited to the details of construction shown as it is obvious that these may be changed in many ways without affecting the principle of the invention. Thus for instance in place of the float, as used in Fig. 1, I can use a plunger, as shown in Fig. 2, this plunger being designated 73. The tank in this figure is designated 40 as it is the same tank as that illustrated in Fig. 1. The electrical connections are the same and hence the same numerals are used to designate these electrical connections. The float 73, as illustrated, is provided with guides 74. These guides may be left off, however, provided the plunger is of sufficient thickness to be guided by the wall of the container. The plunger is provided with the upwardly extending stem 75 carrying the contact 49ª which is the same as the contact 49 previously described. An air outlet 76 is formed in the top of the container so as to permit a proper movement of the plunger and the plunger is shown as being urged downward by a spring. The plunger is also provided with a valve 77 which will release any oil that may find or work its way into the space above the plunger, this valve permitting the running back or release of the oil which may be forced above the plunger by a difference of pressure on the oil on one side or the other of the plunger. The operation of this construction as far as described is precisely the same as that shown in Fig. 1 and the wiring and the thermostat is exactly the same as previously described. There are, however, certain means provided for draining the oil from the container 40 which will be later described.

In Fig. 3 I have shown a slight modification of the thermostat wherein a latch is used to hold the thermostat circuit open after it has cut out the ignition circuit. In this figure the same reference numerals are used as in Fig. 1. The latch, however, is designated 78. While all electrical contacts may be placed outside of the containers and accomplish the same end, which is of course absolutely necessary where the device is being used to indicate the level of gasolene in a container, or used to stop the engine when the gasolene is running out, yet where there is no danger it is preferable to place the contacts within the container as this will tend to reduce arcing due to the oil acting as an extinguisher or spark arrester.

The construction shown in Fig. 2 is intended to be used on motors or in other situations where there is a combination force feed and splash system, the crank case at its bottom forming a reservoir to contain motor oil. A pump pumps the motor oil from the crank case to the bearings by means of a header and the oil eventually finds its way back into the crank case. The pump is connected by means of a by-pass to an oil gage. In Fig. 2 A designates the crank case and B the pump. A pipe $b$ leads downward into the lower end of the crank case and the pump sucks the oil up through this pipe $b$ and discharges it into a pipe $b'$ from which the oil flows to the filter C. From the filter extends a pipe 41ª which ordinarily leads directly to the oil pressure gage but which I have illustrated as leading into the lower end of the container 40ª in Fig. 3. A pipe $c$ leads from the pipe 41ª to the header which in turn leads to the several bearings. My improved controlling device it will be seen is inserted between the pressure gage D and the filter C. So long as the pressure in the pipe 41ª is constant and of a predetermined degree, the float or plunger 73 will be kept raised and when the pressure is reduced, as by the failure of the pump to operate or because the oil has been used up, this plunger 73 will lower due to the lowering of the level of the liquid automatically breaking the circuit to the commutator and the ignition system as previously described. Now in order to provide means for draining the chamber 40ª, I form below the chamber 40ª a chamber 88. The bottom of the container 40ª has a valve seat 89 controlled by a downwardly opening valve 90 carried upon a stem 91 attached to and carried by the plunger 73, this stem, as illustrated, extending through the plunger and into the stem 75 but I do not wish to be limited to this exact construction.

At the lower end of the chamber 88 there is an opening with a valve seat 92 and co-acting with this valve seat is a ball valve 93 which is held up off of the seat by means of a spring 94. The chamber 88 communicates with the crank case through the valve seat 92 by means of a drain pipe 95 which extends into the crank case. Normally and when the parts are working properly the valve 93 will be raised from its seat and the chamber 88 will be emptied and the valve 90 will be closed but if the pressure within the container 40ª decreases below the predetermined amount, then the plunger 73 will descend, opening the valve 90, and the contents of the container 40ª will pass downward into the chamber 88 and so back by way of the drain pipe 95 to the crank case. Now when the pump starts up again it will pump the oil up into the lower portion of the container 40ª and inasmuch as the valve 90 is open, the oil will pass down into the chamber 88 but the pressure on the oil will cause the valve 93 to close so that the chamber 88 will fill up and then the chamber 91 will fill up until the plunger 73 rises, whereupon the valve 90 will close and inasmuch as there will be no more pressure upon the liquid contained in the chamber 88, the valve 93 will open, permitting the oil within the chamber 88 to drain downward and into the crank case.

The constructions shown in Figs. 1 and 2, are adapted to be used for circulating systems where the oil circulates under pressure or, in other words, in such lubricating systems as are used on Overland motor cars, Buick motor cars and many others.

The principal object of placing this mechanism upon automobiles is in order to stop the engine in case the oil supply pipe, the oil plugs, the pet cock, or the crank housing become in any way disconnected or broken, as by striking an object on the road, or jarred loose, whereupon the leakage of oil will immediately stop the motor before any injury can result. It is obvious, as before stated, that this device may be used for other purposes than controlling the circuit through a magneto or through the spark coil of an automobile or internal combustion engine, as for instance it may be used as a protector for water tanks to indicate when the water has become reduced to such a low level as requires attention, and it may be used in the water circulating systems of automobiles. It may also be used for ordinary water tanks either to indicate the level of the water or to cut in or cut out a pumping motor and it will be understood that this mechanism as described is intended to be used with all types of lubrication systems and with all types of motor such as stationary motors, portable motors or marine motors.

Having described my invention, what I claim is:

1. The combination with a liquid reservoir and electrically actuated devices connected to a source of energy, of means for deënergizing said electrically actuated devices a predetermined time after the level of the liquid in the reservoir has descended to a predetermined point including a relatively fixed contact, a movable contact normally in engagement with the fixed contact, a resistance coil operatively connected to the movable contact and operating upon a passage of current through the coil to cause the separation of said contacts to thereby break the circuit through said electrically actuated devices, and float operated means for directing current through said resistance coil when the liquid in the reservoir has descended to a predetermined point.

2. The combination with a liquid reservoir and an electrical circuit, of a relatively slow acting normally inactive circuit breaking means disposed in said circuit, and means for rendering said circuit controlling means active after the liquid has descended to a predetermined point in the reservoir.

3. The combination with a reservoir containing liquid and an electrical circuit, of a relatively slow acting normally deficiently-energized electrical circuit breaking device, and means for effectively energizing said circuit controlling device after the liquid has descended to a predetermined point.

4. The combination with a liquid reservoir and an electric circuit, of means controlling the passage of current through said circuit, said means being normally inactive and including a circuit breaker comprising a relatively fixed contact, a movable contact, a metallic member having a relatively high coefficient of expansion connected to the movable contact, a resistance coil surrounding the metallic member whereby when current is passed through the coil, the coil will become heated and cause an expansion of the metallic member and a separation of the contacts, and float operated means for causing a current to pass through said resistance member when the float has sunk to a predetermined point to thereby cause the breaking of said circuit at a predetermined interval after said float has sunk to said point.

5. The combination with an electric ignition system including a source of energy and a spark forming device, of a reservoir for containing fluid, and means controlled by the rise and fall of fluid within the reservoir establishing a circuit through the igniting devices when the reservoir is full, but breaking said circuit and establishing connection between the ignition devices and the source of energy through a second circuit, when the level of the liquid has descended beyond a predetermined point, and means for breaking said second circuit after a predetermined lapse of time.

6. The combination with the electric-ignition system of an internal combustion engine, said system including a source of energy, and a spark forming device connected by a two branch circuit with the source of energy, a fluid container and a member movable therein by fluid pressure, of means operated by said member for breaking the circuit through one of said branches and successively breaking the circuit through the other branch after a predetermined lapse of time.

7. The combination with the electrical ignition system of an internal combustion engine including a source of energy and a spark forming device connected by a two branch circuit with the source of energy, a fluid container and a member movable therein by fluid pressure, of means operated by said member for breaking the circuit through one of said branches, and means for successively breaking the circuit through the other branch, said last named means including normally engaged contacts connected in said circuit, and a thermostatic member acting to separate said contacts when the thermostatic member is heated.

8. The combination with the electrical ignition system of an internal combustion engine including a source of energy and a spark forming device connected by a two branch circuit with the source of energy, a fluid container, a member movable therein by fluid pressure, of means operated by said member breaking the circuit through one of said branches upon a movement of the member in one direction to a predetermined position, and means for automatically establishing a circuit through the other branch and then breaking said circuit after a predetermined lapse of time.

9. The combination with an electrical ignition system of an internal combustion engine including a source of energy and a spark forming device connected by a two branch circuit with the source of energy, and a fluid container, of a member in the container movable in one direction upon an increase of pressure in the container and in the other direction by a decrease of pressure therein, means operated by said member breaking the circuit through one of said branches upon a movement of said member due to a decrease in pressure, and means for breaking the circuit through the other branch after a predetermined lapse of time and unless the pressure in the container is increased to shift the member to its initial position.

10. The combination with a circuit having two branches both of said branches being connected to a source of energy, of a fluid container, a member therein movable in one direction by an increase of pressure in the fluid container and in the other direction by a decrease in pressure, means actuated by said member for breaking the circuit through one of said branches upon a movement of said member due to a decrease in pressure below a predetermined amount, and means for breaking the circuit through the other of said branches after a predetermined lapse of time unless said member is shifted to its initial position by an increase in pressure to the predetermined degree.

11. The combination with a circuit having two branches, both of said branches being connected to a source of energy, of a fluid container, a member therein movable in one direction by an increase of pressure in the fluid container and in the other direction by a decrease in pressure, means actuated by said member for breaking the circuit through one of said branches upon a movement of said member due to a decrease in pressure below a predetermined amount, and means for breaking the circuit through the other of said branches after a predetermined lapse of time unless said member is shifted to its initial position by an increase in pressure to the predetermined degree, said last named means including normally engaged contacts, a thermostatic member carrying one of said contacts disposed within said circuit and forming part thereof and expansible under heat, said thermostatic member being expanded by the passage of the current through it.

12. The combination with the electrical ignition system of an internal combustion engine including a source of energy and a spark forming device connected by a two branch circuit with the source of energy, and a fluid container wherein fluid is maintained under a predetermined pressure, of a member disposed in said container and shiftable in one direction by the pressure of the fluid but in the other direction by a decrease in the pressure below a predetermined point, means operated by said member for establishing the circuit through one of said branches when the member is held in a predetermined position by the pressure of fluid but breaking said circuit upon a movement of the member due to a decrease in the fluid, and means for then automatically establishing a circuit through the other branch and automatically breaking said circuit after a predetermined lapse of time, and comprising a resistance coil operatively carrying a contact, and a normally fixed contact disposed in said circuit, the coil being expansible when heated by the passage of current to thereby carry its contact out of engagement with the fixed contact.

13. The combination with the electrical ignition system of an internal combustion engine including a source of energy and a spark forming device connected thereto by a two branch circuit, and a container through which fluid circulates under pressure, of a member therein held by a predetermined pressure in a predetermined position, oppositely disposed contacts on the container spaced from each other and connected in one of said branches, a contact maintained by said member between said spaced contacts when the member is in its normal position but disengaged from said contacts when the member shifts due to a decrease in pressure within the container to thereby break the circuit through said branch, and means for then automatically establishing the circuit through the other branch and later breaking said circuit comprising a resistance coil fixedly supported at one end but free to move at its other end, the free end of said resistance coil operatively carrying a contact, a relatively fixed contact with which said first named contact electrically engages, said coil and contacts being disposed in said branch circuit, the passage of current through the coil causing it to expand to thereby disengage the contacts and break the circuit.

14. In a mechanism of the character described, a container through which liquid circulates under pressure, and a member therein maintained in one position by the pressure of liquid on one side of said member, and means for permitting the liquid on the other side of said piston to pass to the first named side, said means including a valve disposed in the piston.

15. The combination with the electrical ignition system of an internal combustion engine, said system including a source of energy and a spark forming device connected thereto by a two branch circuit, and a container through which fluid circulates under pressure, of a member disposed within the container and held by a predetermined pressure in a predetermined position, means carried by said member for maintaining a circuit through one of said branches when the member is in its normal position, but breaking said circuit when the member shifts in one direction due to a decrease in pressure within the container, means for then automatically establishing the circuit through the other branch and later breaking said circuit after a predetermined interval, a chamber disposed below the container and having a valve seat at its upper end, a valve coacting with the seat and having a valve rod moving with the pressure operated member in the container and opening upon a movement of said member due to a decrease in pressure, a drain pipe leading from the lower end of said chamber, and a valve controlling the outlet through said drain pipe normally yieldingly held from its seat but closing said outlet under pressure from within the chamber.

16. The combination with a crank case and a pump drawing oil from the crank case, of a container having a pipe connection to the pump and into which liquid is forced by the pump, a chamber disposed below the container and opening thereinto, a drain pipe leading from the lower end of said chamber to the crank case, a valve controlling the outlet through the drain pipe and normally held in a raised position but shifted to a closed position by pressure within the chamber, a piston disposed within the container and held in a normal position by pressure of oil in the lower portion of the container, means actuated by a descent of said piston due to a decrease in pressure for breaking the circuit through an ignition system, and a valve carried by the piston normally closing the outlet from said container into the chamber but opening upon a descent of the piston to permit the oil within the container to drain out therefrom.

In testimony whereof I hereunto affix my signature in the presence of two witnesses

ALBERT R. MEAD

Witnesses:
C. B. SIGLER,
ROY V. B. COWAN.